(12) United States Patent
Yamakami et al.

(10) Patent No.: US 10,569,369 B2
(45) Date of Patent: Feb. 25, 2020

(54) WIRE CONTAINING FLUX FOR GAS SHIELD ARC WELDING

(71) Applicant: Kobe Steel, Ltd., Kobe-shi (JP)

(72) Inventors: Masafumi Yamakami, Kanagawa (JP); Hiroyuki Kawasaki, Kanagawa (JP); Masayuki Nagami, Kanagawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 161 days.

(21) Appl. No.: 15/515,900

(22) PCT Filed: Oct. 15, 2015

(86) PCT No.: PCT/JP2015/079198
§ 371 (c)(1),
(2) Date: Mar. 30, 2017

(87) PCT Pub. No.: WO2016/060208
PCT Pub. Date: Apr. 21, 2016

(65) Prior Publication Data
US 2017/0297148 A1    Oct. 19, 2017

(30) Foreign Application Priority Data
Oct. 15, 2014    (JP) ................. 2014-211255

(51) Int. Cl.
| B23K 35/00 | (2006.01) |
| B23K 35/30 | (2006.01) |
| B23K 35/368 | (2006.01) |
| B23K 35/36 | (2006.01) |
| B23K 9/16 | (2006.01) |
| B23K 35/02 | (2006.01) |

(52) U.S. Cl.
CPC .......... B23K 35/3093 (2013.01); B23K 9/16 (2013.01); B23K 35/0266 (2013.01); B23K 35/3053 (2013.01); B23K 35/3601 (2013.01); B23K 35/361 (2013.01); B23K 35/3607 (2013.01); B23K 35/368 (2013.01); B23K 35/3608 (2013.01)

(58) Field of Classification Search
CPC ........ B23K 35/00; B23K 35/30; B23K 35/36; B23K 35/3086; B23K 35/308; B23K 35/3053; B23K 35/0266; B23K 35/0255; B23K 35/0261
USPC ..... 219/145.1, 145.22, 146.1, 146.23, 146.3, 219/146.52, 146.31
See application file for complete search history.

(56) References Cited

U.S. PATENT DOCUMENTS

| 5,903,814 | A | 5/1999 | Miura et al. | |
| 6,649,872 | B2 * | 11/2003 | Kato | B23K 35/3608 219/145.22 |
| 6,940,042 | B2 * | 9/2005 | Hara | B23K 35/3053 219/145.22 |
| 2002/0153364 | A1 * | 10/2002 | North | B23K 35/368 219/137 WM |
| 2004/0020912 | A1 | 2/2004 | Hara et al. | |
| 2004/0232131 | A1 * | 11/2004 | North | B23K 35/368 219/145.22 |
| 2006/0255026 | A1 * | 11/2006 | North | B23K 35/368 219/137 WM |
| 2009/0261085 | A1 * | 10/2009 | Suzuki | B23K 9/173 219/137 PS |
| 2011/0062133 | A1 * | 3/2011 | Inoue | B23K 35/3053 219/145.22 |
| 2011/0171485 | A1 * | 7/2011 | Kawamoto | B23K 35/0266 428/576 |
| 2015/0117937 | A1 * | 4/2015 | Nakamura | B23K 35/368 403/272 |
| 2016/0271736 | A1 * | 9/2016 | Han | B23K 35/24 |

FOREIGN PATENT DOCUMENTS

| EP | 0 862 966 A1 | 9/1998 |
| JP | 2004-58086 A | 2/2004 |
| JP | 2008-87043 A | 4/2008 |
| JP | 2008-264868 A | 11/2008 |
| JP | 2009-18316 A | 1/2009 |
| JP | 2010-274304 A | 12/2010 |
| JP | 2012-228704 A | 11/2012 |

OTHER PUBLICATIONS

International Search Report dated Dec. 28, 2015 in PCT/JP2015/079198 (with English language translation).
Written Opinion dated Dec. 28, 2015 in PCT/JP2015/079198 (with English language translation).
Extended European Search Report dated Mar. 29, 2018 in European Patent Application No. 15850051.2, 8 pages.

* cited by examiner

*Primary Examiner* — Dana Ross
*Assistant Examiner* — Ayub A Maye
(74) *Attorney, Agent, or Firm* — Oblon, McClelland, Maier & Neustadt, L.L.P.

(57) ABSTRACT

A flux-cored wire for gas-shielded arc welding has a steel outer sheath filled with a flux. The flux-cored wire includes specific amounts, relative to a total mass of the wire, of $TiO_2$, at least one of Si, an Si oxide and an Si compound, C, Mn, Mo, Ni, at least one of metal Mg and an Mg alloy, an F compound, a K compound, an Na compound, B and a B compound, and Fe, respectively. A total content of each of Ti and a Ti alloy, metal Al and an Al alloy, and V is restricted to the specific range, respectively. A content of Ti is also restricted to the specific range relative to the total mass of the steel outer sheath.

18 Claims, No Drawings

WIRE CONTAINING FLUX FOR GAS SHIELD ARC WELDING

TECHNICAL FIELD

The present invention relates to a flux-cored wire for gas-shielded arc welding. More specifically, the present invention relates to a flux-cored wire for gas shielded arc welding for all-position welding.

BACKGROUND ART

In the field of offshore structures, there is an ongoing trend of advancing development of energy resources in very deep waters, expanding resource exploration/mining zone to an extreme sea area such as Arctic sea, and growing in the equipment size. Against this background of technical trend, a high-strength and high-toughness design of the offshore structure is proceeding, and more stringent requirements are imposed on the performance of the weld joint.

On the other hand, as for the welding material, in view of higher efficiency, a flux-cored wire for all-position welding is demanded. However, a conventional flux-cored wire for all-position welding forms a weld metal having a high oxygen amount and therefore, when gas-shielded arc welding is performed using the wire, the weld joint part can be hardly assured of having low-temperature toughness.

Conventionally, there has also been proposed a flux-cored wire for all-position welding, in which for the purpose of enhancing the low-temperature toughness of a weld metal, the ratio of the content of MgO to the content of $TiO_2$ is set to a specific range and the relationship with a slag forming flux is specified (see, Patent Document 1). Patent Document 1 describes that when welding is performed using the flux-cored wire of Examples, a weld metal having a 0.2% yield strength of 620 MPa or more and a Charpy impact value at −60° C. of 27 J or more is obtained and the welding usability is good.

CITATION LIST

Patent Document

Patent Document 1: JP-A-2008-87043

SUMMARY OF INVENTION

Technical Problem

Recently, in addition to strength and low-temperature toughness, high-temperature cracking resistance is also required of a large structure such as offshore structure, but it is difficult for a conventional flux-cored wire to form a weld metal satisfying all requirements in all-position welding.

Accordingly, a main object of the present invention is to provide a flux-cored wire for gas-shielded arc welding, ensuring that in all-position welding, by virtue of reducing the diffusible hydrogen content, a weld metal excellent in high-temperature cracking resistance, low-temperature cracking resistance and low-temperature toughness at about −60° C. is obtained.

Solution to Problem

The flux-cored wire for gas-shielded arc welding in the present invention has a steel outer sheath filled with a flux, and comprises, relative to a total mass of the wire:

$TiO_2$: from 3 to 8 mass %;
at least one of Si, an Si oxide and an Si compound: from 0.1 to 0.5 mass % in total in terms of Si;
C: from 0.01 to 0.15 mass %;
Mn: from 0.5 to 3.0 mass %;
Mo: from 0.01 to 0.80 mass %;
Ni: from 1 to 3 mass %;
at least one of metal Mg and an Mg alloy: from 0.2 to 1.0 mass % in total in terms of Mg;
an F compound: from 0.01 to 0.400 mass % in total in terms of F;
a K compound: from 0.01 to 0.400 mass % in total in terms of K;
an Na compound: from 0.005 to 0.400 mass % in total in terms of Na;
B and a B compound: from 0.001 to 0.005 mass % in total in terms of B; and
Fe: 80 mass % or more, and
a total content of metal Ti and a Ti alloy is restricted to 0.01 mass % or less in terms of Ti,
a total content of metal Al and an Al alloy is restricted to 0.05 mass % or less in terms of Al,
a content of V is restricted to less than 0.010 mass %, and
a content of Ti is restricted to 0.011 mass % or less relative to the total mass of the steel outer sheath.

In the flux-cored wire for gas-shielded arc welding a content of Al may be restricted to 0.05 mass % or less relative to the total mass of the steel outer sheath.

In addition, a content of B may be restricted to 0.005 mass % or less relative to the total mass of the steel outer sheath.

On the other hand, when, relative to the total mass of the wire, the total content of the metal Ti and Ti alloy in terms of Ti is [Ti], the total content of the B and B compound in terms of B is [B], and the total content of the metal Al and Al alloy in terms of Al is [Al], the relationship thereof may satisfy the following mathematical expression.

$$1000 \times \{[Ti]-([B])^{0.9}\}^2/[Al] \leq 2.00. \quad \text{[Math. 1]}$$

The flux-cored wire for gas-shielded arc welding in the present invention may further comprise at least one of: S: from 0.005 to 0.030 mass %; $ZrO_2$: from 0.05 to 1.00 mass %; and $Al_2O_3$: from 0.01 to 1.00 mass %.

In addition, a content of P may be restricted to 0.030 mass % or less.

In addition, Nb may be restricted to less than 0.010 mass %.

Advantageous Effects of Invention

According to the present invention, a weld metal excellent in both high-temperature cracking resistance and low-temperature cracking resistance can be formed in all-position welding.

DESCRIPTION OF EMBODIMENTS

The embodiment for carrying out the present invention is described in detail below. In the flux-cored wire in this embodiment, a steel outer sheath is filled with a flux, and the outer diameter of the wire is, for example, from 0.9 to 1.6 mm. The flux filling rate may be set to an arbitrary value as long as each component in the wire falls within the range of the present invention, but in view of wire drawing property and usability (e.g., feedability) during welding, the flux filling rate is preferably from 10 to 20 mass % relative to the total mass of the wire.

The flux-cored wire in this embodiment contains, relative to the total mass of the wire: $TiO_2$: from 3 to 8 mass %; at least one of Si, an Si oxide and an Si compound; from 0.1 to 0.5 mass % in total in terms of Si; C: from 0.01 to 0.15 mass %; Mn: from 0.5 to 3.0 mass %; Mo: from 0.01 to 0.80 mass %; Ni: from 1 to 3 mass %; at least one of metal Mg and an Mg alloy: from 0.2 to 1.0 mass % in total in terms of Mg; an F compound: from 0.01 to 0.400 mass % in total in terms of F; a K compound: from 0.01 to 0.400 mass % in total in terms of K; an Na compound: from 0.005 to 0.400 mass % in total in terms of Na; and B and a B compound: from 0.001 to 0.005 mass % in total in terms of B.

In this flax-cored wire, relative to the total mass of the wire, a total content of metal Ti and a Ti alloy is restricted to 0.01 mass % or less in terms of Ti, a total content of metal Al and an Al alloy is restricted to 0.05 mass % or less in terms of Al, and a content of V is restricted to less than 0.010 mass %. The component other than those above, i.e., the remainder, in the flux-cored wire of this embodiment is Fe and unavoidable impurities.

In the flux-cored wire in this embodiment, out of the components of the outer sheath, a content of Ti is restricted to 0.011 mass % or less relative to the total mass of the outer sheath. The flux-cored wire in this embodiment is used for gas-shielded arc welding and can be applied to all-position welding.

The reasons for numerically limiting each of the components contained in the flux-cored wire in this embodiment are described below.

(Steel Outer Sheath)

The additive elements contained in the steel outer sheath (hereinafter, sometimes simply referred to as "outer sheath") are less likely to be consumed by oxidation during melting, as compared with additive elements contained in the flux, and therefore, generally impose a great effect on the weld metal. For this reason, various trace elements forming an oxide are restricted as follows.

[Ti: 0.011 Mass % or Less]

If the Ti content of the outer sheath exceeds 0.011 mass %, a carbide is readily produced during welding to significantly deteriorate the toughness of the weld metal. Accordingly, the content of Ti contained in the outer sheath is restricted to 0.011 mass % or less relative to the total mass of the outer sheath. From the viewpoint of enhancing the toughness of the weld metal, the Ti content of the outer sheath is preferably 0.010 mass % or less relative to the total mass of the outer sheath.

[Al: 0.05 Mass % or Less]

If a large amount of Al is contained in the outer sheath, an oxide is formed during welding to cause deterioration of the toughness of the weld metal. Accordingly, from the viewpoint of preventing deterioration of the toughness of the weld metal, the Al content of the outer sheath is preferably 0.05 mass % or less, more preferably 0.030 mass % or less, relative to the total mass of the outer sheath.

[B: 0.005 Mass % or Less]

B in the outer sheath, even in trace amount, gives rise to generation of cracking. Accordingly, from the viewpoint of enhancing the cracking resistance of the weld metal, the B content of the outer sheath is preferably 0.005 mass % or less, more preferably 0.001 mass % or less, relative to the total mass of the outer sheath.

(Entire Wire)

[$TiO_2$: From 3 to 8 Mass %]

$TiO_2$ is a main component of slag, and if the $TiO_2$ content is less than 3 mass % relative to the total mass of the wire, welding in position (vertical, overheat, etc.) except for flat is difficult to be performed, and all-position weldability cannot be ensured. On the other hand, if the $TiO_2$ content exceeds 8 mass % relative to the total mass of the wire, $TiO_2$ remains as a fine particle in the weld metal, and the toughness of the weld metal deteriorates. Accordingly, the $TiO_2$ content is set to be from 3 to 8 mass % relative to the total mass of the wire.

[Si, Si Oxide and Si Compound: From 0.1 to 0.5 Mass %]

The flux-cored wire in this embodiment contains at least one of Si, an Si oxide and an Si compound. The metal Si has an effect of decreasing the viscosity of the weld pool, and in the molten slag, the metal Si produces $SiO_2$ having an effect of increasing the fluidity by its deoxidizing action. Here, Si added in the form of an oxide or a compound is reduced by a redox reaction with a molten metal at the molten slag interface and is present as metal Si in the molten metal.

If the total content of Si, an Si oxide and an Si compound in terms of Si is less than 0.1 mass % relative to the total mass of the wire, the viscosity of the molten metal increases to decrease compatibility with the matrix, and a deoxidizing effect is insufficient, leading to generation of a blow hole in the weld metal. On the other hand, if the total content of Si, an Si oxide and an Si compound in terms of Si exceeds 0.5 mass %, the strength of the weld metal is excessively increased to readily generate cracking. Accordingly, the total content of Si, an Si oxide and an Si compound in terms of Si is set to be from 0.1 to 0.5 mass %.

[C: From 0.01 to 0.15 Mass %]

C has an effect of enhancing the strength of the weld metal. However, if the C content is less than 0.01 mass % relative to the total mass of the wire, the effect above is not sufficiently obtained, and the yield strength decreases. On the other hand, if the C content exceeds 0.15 mass % relative to the total mass of the wire, island-like martensite is produced in the weld metal, and the toughness deteriorates. Accordingly, the C content is set to be from 0.01 to 0.15 mass % relative to the total mass of the wire.

[Mn: From 0.5 to 3.0 Mass %]

Mn has an effect of promoting deoxidation of the weld metal and increasing the toughness and strength of the weld metal. However, if the Mn content is less than 0.5 mass % relative to the total mass of the wire, the above-described effect is insufficient, leading to generation of a blow hole in the weld metal or deterioration of the toughness of the weld metal. On the other hand, if the Mn content exceeds 3.0 mass % relative to the total mass of the wire, the strength of the weld metal is excessively increased to readily generate cracking. Accordingly, the Mn content is set to be from 0.5 to 3.0 mass % relative to the total mass of the wire.

[Mo: From 0.01 to 0.80 Mass %]

Mo is an element contributing to enhancing the strength of the weld metal, and if the Mo content is less than 0.01 mass % relative to the total mass of the wire, the weld metal lacks the tensile strength. On the other hand, if the Mo content exceeds 0.80 mass % relative to the total mass of the wire, the strength of the weld metal is excessively increased to readily generate cracking. Accordingly, the Mo content is set to be from 0.01 to 0.80 mass % relative to the total mass of the wire.

[Ni: From 1 to 3 Mass %]

Ni is an element contributing to ensuring the toughness of the weld metal, and if the Ni content is less than 1 mass % relative to the total mass of the wire, the toughness of the weld metal deteriorates. On the other hand, if the Ni content exceeds 3 mass % relative to the total mass of the wire, high-temperature cracking is readily generated in the weld metal. Accordingly, the Ni content is set to be from 1 to 3 mass % relative to the total mass of the wire.

[Metal Mg and Mg Alloy: From 0.2 to 1.0 Mass %]

Mg is an element having a deoxidizing action, and the flux-cored wire in this embodiment contains, as an Mg source, at least one of metal Mg and an Mg alloy. However, if the total content of metal Mg and an Mg alloy in terms of Mg is less than 0.2 mass % relative to the total mass of the wire, the deoxidation is insufficient, leading to generation of a blow hole in the weld metal or deterioration of the toughness. On the other hand, if the total content of metal Mg and an Mg alloy in terms of Mg exceeds 1.0 mass % relative to the total mass of the wire, the strength of the weld metal is excessively increased to readily generate cracking.

Accordingly, the Mg content is set to be from 0.2 to 1.0 mass % relative to the total mass of the wire. The total content of metal Mg and an Mg alloy as specified herein is a value calculated from the amount of acid-soluble Mg measured after treatment with aqua regia.

[F Compound: From 0.010 to 0.400 Mass %]

An F compound has an effect of decreasing the diffusible hydrogen content of the weld metal by combining with hydrogen (H) to form HF during welding, and the flux-cored wire in this embodiment contains one kind or two or more kinds of F compounds. Specific examples of the F compound added to the flux-cored wire in this embodiment include $CaF_2$, $BaF_2$, NaF, $K_2SiF_6$, $SrF_2$, $AlF_3$, $MgF_2$, and LiF. Here, in $K_2SiF_6$, the content of $K_2$ is a value of a K compound in terms of K, the content of Si is a value of an Si compound in terms of Si, and the content of $F_6$ is a value of an F compound in terms of F.

However, if the total content of the F compound in terms of F is less than 0.01 mass % relative to the total mass of the wire, the diffusible hydrogen content of the weld metal increases, and low-temperature cracking is likely to occur. On the other hand, if the total content of the F compound in terms of F exceeds 0.400 mass % relative to the total mass of the wire, the wire is susceptible to moisture absorption and in turn, the diffusible hydrogen content of the weld metal increases, and as a result, low-temperature cracking is likely to occur. Accordingly, the total content of the F compound in terms of F is set to be from 0.010 to 0.400 mass % relative to the total mass of the wire.

[K Compound: From 0.010 to 0.400 Mass %]

K has an effect of stabilizing the arc, and the flux-cored wire in this embodiment contains one kind or two or more kinds of K compounds. Specific examples of the K compound added to the flux-cored wire in this embodiment include $K_2O$, KF, and $K_2SiF_6$. Here, in KF, the content of K is a value of a K compound in terms of K, and the content of F is a value of an F compound in terms of F. The contents in $K_2SiF_6$ are as described above.

However, if the total content of the K compound in terms of K is less than 0.01 mass % relative to the total mass of the wire, the above-described effect is insufficient, and the arc becomes unstable. On the other hand, if the total content of the K compound exceeds 0.400 mass %, although the arc is stabilized, the moisture absorption resistance of the wire is reduced and in turn, the diffusible hydrogen content of the weld metal increases, and as a result, low-temperature cracking is likely to occur. Accordingly, the total content of the K compound in terms of K is set to be from 0.010 to 0.400 mass % relative to the total mass of the wire.

[Na Compound: From 0.005 to 0.400 Mass %]

As with K, Na has an effect of stabilizing the arc, and the flux-cored wire in this embodiment contains one kind or two or more kinds of Na compounds. Specific examples of the Na compound added to the flux-cored wire in this embodiment include NaF, $Na_2O$, and $Na_2CO_3$. Here, in NaF, the content of Na is a value of an Na compound in terms of Na, and the content of F is a value of an F compound in terms of F.

However, if the total content of the Na compound in terms of Na is less than 0.005 mass % relative to the total mass of the wire, the above-described effect is insufficient, and the arc becomes unstable. On the other hand, if the total content of the Na compound in terms of Na exceeds 0.400 mass % relative to the total mass of the wire, although the arc is stabilized, the moisture absorption resistance of the wire is reduced and in turn, the diffusible hydrogen content of the weld metal increases, and as a result, low-temperature cracking is likely to occur. Accordingly, the total content of the Na compound in terms of Na is set to be from 0.005 to 0.400 mass % relative to the total mass of the wire.

[B and B Compound: From 0.001 to 0.005 Mass %]

B has an effect of enhancing the toughness of the weld metal by segregating at the old austenite ($\gamma$) grain boundary. However, if the total content of B and a B compound in terms of B is less than 0.001 mass % relative to the total mass of the wire, the effect above is not sufficiently obtained. On the other hand, if the total content of B and a B compound in terms of B exceeds 0.005 mass % relative to the total mass of the wire, high-temperature cracking (solidification cracking) is readily generated in the weld metal. Accordingly, the B content is set to be from 0.001 to 0.005 mass % relative to the total mass of the wire. From the viewpoint of enhancing the high-temperature cracking resistance, the total content of B and a B compound in terms of B is preferably 0.004 mass % or less relative to the total mass of the wire. Examples of the B compound include, for example, Fe—B, Fe—Si—B, $B_2O_3$, and a composite oxide containing $B_2O_3$.

[Metal Ti and Ti Alloy: 0.01 Mass % or Less]

Ti is added in the form of a metal or an alloy and in the form of a compound such as oxide or intermetallic compound. However, out of Ti sources, if the total content of metal Ti and a Ti alloy in terms of Ti exceeds 0.01 mass % relative to the total mass of the wire, the amount of solute Ti in the weld metal increases to cause precipitation of TiC in a reheated part, and the toughness is therefore reduced. Accordingly, the total content of Ti added in the form of a metal or an alloy is restricted to be 0.01 mass % or less relative to the total mass of the wire. From the viewpoint of enhancing the toughness of the weld metal, the total content of metal Ti and a Ti alloy is preferably 0.004 mass % or less relative to the total mass of the wire.

[Metal Al and Al Alloy: 0.05 Mass % or Less]

Al is added in the form of a metal or an alloy and in the form of a compound such as oxide or intermetallic compound, but if the total content of metal Al and an Al alloy in terms of Al exceeds 0.05 mass % relative to the total mass of the wire, a large number of coarse oxides are produced in the weld metal, and the toughness deteriorates. Accordingly, the total content of metal Al and an Al alloy in terms of Al is restricted to be 0.05 mass % or less relative to the total mass of the wire. From the viewpoint of enhancing the toughness of the weld metal, the total content of metal Al and an Al alloy is preferably 0.030 mass % or less relative to the total mass of the wire.

[V: Less than 0.010 Mass %]

V is an element segregating at the grain boundary to cause grain boundary fracture, and if the V content is 0.010 mass % or more relative to the total mass of the wire, the toughness of the weld metal deteriorates. Accordingly, the V content is restricted to be less than 0.010 mass % relative to the total mass of the wire. From the viewpoint of enhancing the toughness of the weld metal, the V content is preferably 0.005 mass % or less relative to the total mass of the wire.
[Remainder]

The remainder in the composition of components of the flux-cored wire in this embodiment is Fe, an alloying agent such as Cu, Cr, Ca, Nb and Li, a compound thereof, an arc stabilizer, a slag former, and unavoidable impurities such as P, Sb and As. In the case where each of the elements above is added as an oxide or a nitride, the remainder of the flux-cored wire in this embodiment includes O or N as well. From the viewpoint of ensuring the deposition amount, the flux-cored wire in this embodiment contains Fe in an amount of 80 mass % or more relative to the total mass of the wire.
[S: From 0.005 to 0.030 Mass %]

S reduces the toughness of the weld metal and therefore, is generally treated as a restricted element, but because of its effect of improving compatibility in the bead toe, this element may also be positively added. However, if the S content is less than 0.005 mass % relative to the total mass of the wire, the effect above is not obtained, and the compatibility of bead decreases. On the other hand, if the S content exceeds 0.030 mass % relative to the total mass of the wire, the high-temperature cracking resistance of the weld metal is reduced. Accordingly, in the case of adding S, the content thereof is set to be from 0.005 to 0.030 mass % relative to the total mass of the wire.
[$ZrO_2$: From 0.05 to 1.00 Mass %]

$ZrO_2$ has an effect of enhancing the bead shape and can be therefore added, if desired. However, if the $ZrO_2$ content is less than 0.05 mass % relative to the total mass of the wire, the effect above is not sufficiently obtained. On the other hand, if the $ZrO_2$ content exceeds 1.00 mass % relative to the total mass of the wire, a convex bead shape is formed. Accordingly, in the case of adding $ZrO_2$, the content thereof is set to be from 0.05 to 1.00 mass % relative to the total mass of the wire.
[$Al_2O_3$: From 0.01 to 1.00 Mass %]

$Al_2O_3$ has an effect of enhancing the bead shape and can be therefore added, if desired. However, if the $Al_2O_3$ content is less than 0.01 mass % relative to the total mass of the wire, the effect above is not sufficiently obtained. On the other hand, if the $Al_2O_3$ content exceeds 1.00 mass % relative to the total mass of the wire, the compatibility of bead decreases. Accordingly, in the case of adding $Al_2O_3$, the content thereof is set to be from 0.01 to 1.00 mass % relative to the total mass of the wire.
[P: 0.030 Mass % or Less]

P is an unavoidable impurity, and if the P content exceeds 0.030 mass % relative to the total mass of the wire, the high-temperature cracking resistance of the weld metal may be reduced. Accordingly, the P content is preferably restricted to be 0.030 mass % or less relative to the total mass of the wire.
[Nb: Less than 0.010 Mass %]

Nb is an alloying agent but readily segregates at the grain boundary and therefore, if the Nb content is 0.010 mass % or more, grain boundary fracture is likely to occur, causing deterioration of the toughness of the weld metal. Accordingly, the Nb content is preferably set to be less than 0.010 mass % relative to the total mass of the wire.
[Relationship of Ti—B—Al]

In the flux-cored wire in this embodiment, the relationship of the contents of respective elements Ti, B and Al preferably satisfies the following mathematical expression 2. In the mathematical expression 2, [Ti] is the total content of metal Ti and a Ti alloy, in terms of Ti, relative to the total mass of the wire, [B] is the total content of B and a B compound, in terms of B, relative to the total mass of the wire, and [Al] is the total content of metal Al and an Al alloy, in terms of Al, relative to the total mass of the wire.

$$1000 \times \{[Ti]-([B])^{0.9}\}^2/[Al] \leq 2.00 \quad \text{[Math. 2]}$$

When the relationship of the contents of respective elements Ti, B and Al satisfies the mathematical expression 2 in the composition, the Charpy impact value of the weld metal can be increased, and the high-temperature cracking resistance can be enhanced.

As described in detail above, in the flux-cored wire in this embodiment, the composition of components of the wire is specified, and the Ti content in the outer sheath is restricted, so that the diffusible hydrogen content of the weld metal, which gives rise to low-temperature cracking, can be decreased and the high-temperature cracking resistance can be enhanced. As a result, a weld metal excellent in both low-temperature cracking resistance and high-temperature cracking resistance is obtained in all-position welding.
[Manufacturing Method]

The method for manufacturing the flux-cored wire in this embodiment is not particularly limited, but the wire can be manufactured, for example, by the following method. A steel strip constituting the outer sheath is formed on a forming roll while feeding it in the longitudinal direction to obtain a U-shaped open tube. The steel outer sheath is filled with a flux having blended therein an oxide, a metal or alloy, an Fe powder, etc. each in a predetermined amount and then processed to have a circular cross-section. Thereafter, the wire is drawn by cold working to have a wire diameter of, for example, from 1.0 to 2.0 mm. In the middle of cold working, annealing may be applied.

EXAMPLES

The effects of the present invention are specifically described below by referring to Examples of the present invention and Comparative Examples. In these examples, a tubular outer sheath (diameter: 1.2 mm) formed of a carbon steel having a component composition in the range shown in Table 1 was filled with a flux to produce flux-cored wires of Examples and Comparative Examples. As to the components of the outer sheath shown in Table 1, the remainder is Fe and unavoidable impurities. At this time, the flux filling rate was adjusted to fall in the range of 12.5 to 14.5 mass % relative to the total mass of the wire.

TABLE 1

| Range of Components of Outer Sheath (mass %) | | | | | | | | | | |
|---|---|---|---|---|---|---|---|---|---|---|
| C | Si | Mn | P | S | Cu | Ni | Cr | Ti | Al | B |
| ≤0.10 | ≤0.10 | 0.10 to 0.90 | ≤0.03 | ≤0.03 | ≤0.20 | | | ≤0.05 | ≤0.05 | ≤0.005 |

In Tables 2 and 3 below, the amounts of Ti, Al and B contained in the outer sheath of each of the flux-cored wires of Examples and Comparative Examples and the component composition of the entire wire are shown. As to the wire components shown in Tables 2 and 3, the remainder is unavoidable impurities. In addition, "s" of Mg, Ti and Al means "soluble", i.e., acid-soluble, and, for example, s.Mg indicates the content of metal Mg and an Mg alloy in terms of Mg. Furthermore, F(Ti,B,Al) indicates the value of "$1000\times\{[Ti]-([B])^{0.9}\}^2/[Al]$".

TABLE 2

| | | Outer Sheath (mass %) | | | Wire Components (mass %) | | | | | | | | | |
|---|---|---|---|---|---|---|---|---|---|---|---|---|---|---|
| | No. | Ti | Al | B | TiO$_2$ | Total.Si | C | Mn | Mo | Ni | S.Mg | Total.F | Total.K | Total.Na |
| Example | 1 | 0.011 | 0.010 | 0.0020 | 6.22 | 0.41 | 0.14 | 2.4 | 0.11 | 2.1 | 0.47 | 0.270 | 0.060 | 0.017 |
| | 2 | 0.003 | 0.010 | 0.0010 | 7.99 | 0.25 | 0.07 | 2.4 | 0.33 | 1.8 | 0.50 | 0.220 | 0.200 | 0.242 |
| | 3 | 0.004 | 0.013 | 0.0000 | 3.01 | 0.28 | 0.12 | 2.4 | 0.29 | 2.5 | 0.65 | 0.190 | 0.210 | 0.051 |
| | 4 | 0.002 | 0.006 | 0.0000 | 6.63 | 0.49 | 0.12 | 2.1 | 0.21 | 2.3 | 0.69 | 0.190 | 0.280 | 0.225 |
| | 5 | 0.004 | 0.007 | 0.0000 | 4.35 | 0.10 | 0.05 | 2.2 | 0.55 | 1.6 | 0.76 | 0.270 | 0.220 | 0.201 |
| | 6 | 0.008 | 0.004 | 0.0010 | 6.62 | 0.23 | 0.14 | 1.4 | 0.61 | 1.6 | 0.71 | 0.160 | 0.220 | 0.246 |
| | 7 | 0.006 | 0.005 | 0.0000 | 4.41 | 0.30 | 0.01 | 2.5 | 0.22 | 1.8 | 0.52 | 0.230 | 0.280 | 0.247 |
| | 8 | 0.001 | 0.014 | 0.0000 | 6.91 | 0.30 | 0.07 | 2.9 | 0.60 | 2.0 | 0.59 | 0.280 | 0.290 | 0.193 |
| | 9 | 0.001 | 0.007 | 0.0000 | 5.89 | 0.34 | 0.07 | 0.6 | 0.44 | 2.1 | 0.77 | 0.100 | 0.240 | 0.240 |
| | 10 | 0.004 | 0.013 | 0.0010 | 6.65 | 0.23 | 0.07 | 1.5 | 0.79 | 1.8 | 0.77 | 0.150 | 0.200 | 0.158 |
| | 11 | 0.004 | 0.010 | 0.0010 | 5.12 | 0.32 | 0.07 | 1.9 | 0.02 | 1.8 | 0.69 | 0.220 | 0.120 | 0.204 |
| | 12 | 0.005 | 0.006 | 0.0010 | 4.26 | 0.22 | 0.11 | 1.6 | 0.18 | 2.9 | 0.72 | 0.280 | 0.300 | 0.191 |
| | 13 | 0.005 | 0.012 | 0.0000 | 6.77 | 0.31 | 0.12 | 1.5 | 0.37 | 1.1 | 0.73 | 0.220 | 0.230 | 0.149 |
| | 14 | 0.005 | 0.004 | 0.0010 | 6.86 | 0.36 | 0.05 | 1.6 | 0.18 | 1.6 | 0.99 | 0.270 | 0.270 | 0.089 |
| | 15 | 0.002 | 0.005 | 0.0010 | 6.57 | 0.34 | 0.05 | 1.2 | 0.26 | 2.0 | 0.21 | 0.210 | 0.150 | 0.052 |
| | 16 | 0.009 | 0.011 | 0.0010 | 4.25 | 0.24 | 0.09 | 2.0 | 0.55 | 2.0 | 0.61 | 0.390 | 0.160 | 0.112 |
| | 17 | 0.007 | 0.008 | 0.0010 | 4.53 | 0.29 | 0.10 | 1.6 | 0.32 | 2.4 | 0.67 | 0.020 | 0.160 | 0.047 |
| | 18 | 0.001 | 0.015 | 0.0010 | 4.50 | 0.31 | 0.09 | 1.1 | 0.09 | 2.4 | 0.68 | 0.300 | 0.380 | 0.031 |
| | 19 | 0.008 | 0.008 | 0.0010 | 6.50 | 0.29 | 0.11 | 2.3 | 0.27 | 2.0 | 0.70 | 0.250 | 0.020 | 0.087 |
| | 20 | 0.003 | 0.014 | 0.0010 | 6.29 | 0.29 | 0.07 | 1.5 | 0.62 | 2.4 | 0.64 | 0.140 | 0.280 | 0.399 |
| | 21 | 0.002 | 0.006 | 0.0010 | 6.80 | 0.28 | 0.07 | 2.5 | 0.07 | 2.1 | 0.54 | 0.220 | 0.180 | 0.007 |

| | | Wire Components (mass %) | | | | | | | | | | |
|---|---|---|---|---|---|---|---|---|---|---|---|---|
| | No. | B | S.Ti | S.Al | Fe | V | S | P | Nb | ZrO$_2$ | Al$_2$O$_3$ | F(Ti, B, Al) |
| Example | 1 | 0.0015 | 0.009 | 0.004 | 87.0 | 0.0009 | 0.004 | 0.007 | 0.0008 | 0.55 | 0.200 | 9.38 |
| | 2 | 0.0030 | 0.004 | 0.010 | 84.9 | 0.0029 | 0.018 | 0.012 | 0.0076 | 0.71 | 0.319 | 0.19 |
| | 3 | 0.0031 | 0.003 | 0.005 | 89.4 | 0.0030 | 0.017 | 0.010 | 0.0036 | 0.17 | 0.70 | 1.27 |
| | 4 | 0.0031 | 0.002 | 0.019 | 85.3 | 0.0041 | 0.018 | 0.007 | 0.0039 | 0.79 | 0.62 | 0.65 |
| | 5 | 0.0027 | 0.001 | 0.028 | 88.9 | 0.0035 | 0.017 | 0.014 | 0.0068 | 0.47 | 0.22 | 0.54 |
| | 6 | 0.0037 | 0.003 | 0.009 | 87.4 | 0.0063 | 0.011 | 0.010 | 0.0077 | 0.51 | 0.13 | 1.34 |
| | 7 | 0.0034 | 0.006 | 0.012 | 88.1 | 0.0070 | 0.011 | 0.015 | 0.0054 | 0.71 | 0.59 | 0.00 |
| | 8 | 0.0033 | 0.001 | 0.012 | 85.4 | 0.0062 | 0.009 | 0.017 | 0.0040 | 0.09 | 0.29 | 1.95 |
| | 9 | 0.0027 | 0.003 | 0.024 | 88.0 | 0.0077 | 0.019 | 0.012 | 0.0062 | 0.47 | 0.69 | 0.15 |
| | 10 | 0.0028 | 0.005 | 0.018 | 86.6 | 0.0050 | 0.019 | 0.006 | 0.0056 | 0.61 | 0.24 | 0.00 |
| | 11 | 0.0020 | 0.002 | 0.016 | 88.6 | 0.0038 | 0.012 | 0.016 | 0.0058 | 0.23 | 0.61 | 0.19 |
| | 12 | 0.0037 | 0.004 | 0.006 | 88.2 | 0.0074 | 0.011 | 0.016 | 0.0070 | 0.40 | 0.56 | 1.02 |
| | 13 | 0.0022 | 0.003 | 0.026 | 87.6 | 0.0019 | 0.014 | 0.008 | 0.0078 | 0.48 | 0.36 | 0.04 |
| | 14 | 0.0023 | 0.004 | 0.024 | 86.6 | 0.0077 | 0.010 | 0.006 | 0.0041 | 0.74 | 0.38 | 0.00 |
| | 15 | 0.0029 | 0.004 | 0.011 | 88.3 | 0.0053 | 0.011 | 0.014 | 0.0071 | 0.29 | 0.27 | 0.13 |
| | 16 | 0.0035 | 0.001 | 0.017 | 88.6 | 0.0016 | 0.019 | 0.014 | 0.0030 | 0.19 | 0.70 | 1.57 |
| | 17 | 0.0035 | 0.005 | 0.022 | 89.2 | 0.0036 | 0.016 | 0.017 | 0.0057 | 0.15 | 0.42 | 0.06 |
| | 18 | 0.0027 | 0.005 | 0.020 | 89.3 | 0.0027 | 0.014 | 0.017 | 0.0033 | 0.46 | 0.28 | 0.00 |
| | 19 | 0.0021 | 0.006 | 0.006 | 86.0 | 0.0055 | 0.013 | 0.013 | 0.0057 | 0.63 | 0.77 | 0.74 |
| | 20 | 0.0032 | 0.005 | 0.015 | 86.0 | 0.0079 | 0.019 | 0.018 | 0.0007 | 0.54 | 0.73 | 0.03 |
| | 21 | 0.0034 | 0.005 | 0.027 | 86.1 | 0.0045 | 0.011 | 0.013 | 0.0027 | 0.59 | 0.44 | 0.04 |

| | | Outer Sheath (mass %) | | | Wire Components (mass %) | | | | | | | | | |
|---|---|---|---|---|---|---|---|---|---|---|---|---|---|---|
| | No. | Ti | Al | B | TiO$_2$ | Total.Si | C | Mn | Mo | Ni | S.Mg | Total.F | Total.K | Total.Na |
| Example | 22 | 0.002 | 0.012 | 0.0010 | 6.56 | 0.29 | 0.06 | 2.0 | 0.61 | 1.6 | 0.58 | 0.150 | 0.230 | 0.162 |
| | 23 | 0.005 | 0.014 | 0.0010 | 4.68 | 0.35 | 0.10 | 1.2 | 0.12 | 1.8 | 0.79 | 0.260 | 0.190 | 0.012 |
| | 24 | 0.004 | 0.009 | 0.0000 | 6.49 | 0.28 | 0.11 | 1.6 | 0.62 | 2.0 | 0.54 | 0.180 | 0.250 | 0.226 |
| | 25 | 0.008 | 0.009 | 0.0000 | 6.12 | 0.38 | 0.08 | 1.0 | 0.49 | 1.6 | 0.65 | 0.270 | 0.300 | 0.155 |
| | 26 | 0.004 | 0.013 | 0.0010 | 7.99 | 0.29 | 0.09 | 2.9 | 0.75 | 2.8 | 0.57 | 0.300 | 0.180 | 0.224 |
| | 27 | 0.003 | 0.009 | 0.0010 | 5.78 | 0.37 | 0.06 | 1.5 | 0.16 | 2.0 | 0.69 | 0.130 | 0.170 | 0.017 |
| | 28 | 0.008 | 0.007 | 0.0010 | 6.11 | 0.35 | 0.07 | 1.7 | 0.18 | 1.7 | 0.52 | 0.160 | 0.260 | 0.191 |
| | 29 | 0.002 | 0.014 | 0.0010 | 5.13 | 0.36 | 0.09 | 1.1 | 0.26 | 1.7 | 0.76 | 0.250 | 0.270 | 0.130 |
| | 30 | 0.008 | 0.012 | 0.0000 | 4.81 | 0.31 | 0.11 | 2.0 | 0.19 | 1.9 | 0.66 | 0.180 | 0.240 | 0.077 |
| | 31 | 0.003 | 0.011 | 0.0010 | 6.60 | 0.29 | 0.11 | 1.8 | 0.08 | 1.7 | 0.65 | 0.110 | 0.190 | 0.146 |
| | 32 | 0.008 | 0.004 | 0.0000 | 6.58 | 0.38 | 0.08 | 1.6 | 0.36 | 2.5 | 0.68 | 0.250 | 0.200 | 0.059 |
| | 33 | 0.009 | 0.007 | 0.0000 | 4.90 | 0.36 | 0.08 | 2.3 | 0.41 | 1.8 | 0.67 | 0.140 | 0.150 | 0.131 |
| | 34 | 0.001 | 0.006 | 0.0010 | 4.66 | 0.29 | 0.06 | 1.5 | 0.32 | 2.0 | 0.72 | 0.120 | 0.250 | 0.182 |
| | 35 | 0.006 | 0.010 | 0.0000 | 4.59 | 0.34 | 0.10 | 1.9 | 0.48 | 2.0 | 0.53 | 0.240 | 0.220 | 0.051 |
| | 36 | 0.007 | 0.004 | 0.0010 | 6.53 | 0.30 | 0.06 | 1.3 | 0.24 | 1.7 | 0.60 | 0.270 | 0.300 | 0.106 |

TABLE 2-continued

|   |    |       |       |        |      |      |      |     |      |     |      |       |       |       |
|---|----|-------|-------|--------|------|------|------|-----|------|-----|------|-------|-------|-------|
|   | 37 | 0.002 | 0.014 | 0.0010 | 5.13 | 0.36 | 0.09 | 1.1 | 0.26 | 1.7 | 0.76 | 0.250 | 0.270 | 0.130 |
|   | 38 | 0.009 | 0.007 | 0.0000 | 4.90 | 0.36 | 0.08 | 2.3 | 0.41 | 1.8 | 0.67 | 0.140 | 0.150 | 0.131 |
|   | 39 | 0.009 | 0.007 | 0.0000 | 4.90 | 0.36 | 0.08 | 2.3 | 0.41 | 1.8 | 0.67 | 0.140 | 0.150 | 0.131 |
|   | 40 | 0.005 | 0.055 | 0.0010 | 4.28 | 0.30 | 0.06 | 2.3 | 0.49 | 1.7 | 0.67 | 0.200 | 0.260 | 0.206 |
|   | 41 | 0.008 | 0.012 | 0.0060 | 6.88 | 0.39 | 0.11 | 1.1 | 0.19 | 1.9 | 0.77 | 0.290 | 0.160 | 0.104 |

|         |     | Wire Components (mass %) |       |       |      |        |       |       |        |         |         |              |
|---------|-----|--------|-------|-------|------|--------|-------|-------|--------|---------|---------|--------------|
|         | No. | B      | S.Ti  | S.Al  | Fe   | V      | S     | P     | Nb     | ZrO$_2$ | Al$_2$O$_3$ | F(Ti, B, Al) |
| Example | 22  | 0.0048 | 0.005 | 0.019 | 86.8 | 0.0049 | 0.010 | 0.013 | 0.0056 | 0.68    | 0.22    | 0.53         |
|         | 23  | 0.0015 | 0.005 | 0.019 | 89.5 | 0.0032 | 0.014 | 0.010 | 0.0049 | 0.64    | 0.31    | 0.24         |
|         | 24  | 0.0036 | 0.009 | 0.016 | 87.2 | 0.0038 | 0.012 | 0.014 | 0.0065 | 0.36    | 0.07    | 0.45         |
|         | 25  | 0.0031 | 0.005 | 0.045 | 88.1 | 0.0008 | 0.017 | 0.018 | 0.0040 | 0.59    | 0.18    | 0.01         |
|         | 26  | 0.0037 | 0.003 | 0.026 | 81.0 | 0.0059 | 0.013 | 0.007 | 0.0027 | 0.69    | 0.64    | 0.47         |
|         | 27  | 0.0030 | 0.002 | 0.010 | 88.6 | 0.0090 | 0.015 | 0.011 | 0.0031 | 0.08    | 0.38    | 1.13         |
|         | 28  | 0.0030 | 0.001 | 0.015 | 88.0 | 0.0048 | 0.031 | 0.008 | 0.0008 | 0.12    | 0.58    | 1.27         |
|         | 29  | 0.0031 | 0.004 | 0.018 | 89.0 | 0.0032 | 0.004 | 0.008 | 0.0019 | 0.42    | 0.45    | 0.13         |
|         | 30  | 0.0025 | 0.002 | 0.029 | 88.6 | 0.0018 | 0.011 | 0.031 | 0.0010 | 0.52    | 0.31    | 0.22         |
|         | 31  | 0.0030 | 0.003 | 0.019 | 87.8 | 0.0072 | 0.017 | 0.019 | 0.010  | 0.32    | 0.16    | 0.29         |
|         | 32  | 0.0036 | 0.004 | 0.029 | 85.6 | 0.0022 | 0.017 | 0.012 | 0.0042 | 1.05    | 0.59    | 0.19         |
|         | 33  | 0.0022 | 0.002 | 0.010 | 88.2 | 0.0057 | 0.013 | 0.014 | —      | 0.04    | 0.78    | 0.42         |
|         | 34  | 0.0024 | 0.003 | 0.011 | 88.1 | 0.0058 | 0.017 | 0.009 | 0.0053 | 0.68    | 1.02    | 0.17         |
|         | 35  | 0.0031 | 0.005 | 0.007 | 89.2 | 0.0026 | 0.016 | —     | 0.0061 | 0.28    | —       | 0.04         |
|         | 36  | 0.0036 | 0.002 | 0.009 | 87.2 | 0.0077 | 0.017 | 0.016 | 0.0028 | 0.69    | 0.67    | 2.07         |
|         | 37  | 0.0031 | 0.004 | 0.018 | 89.0 | 0.0032 | —     | 0.008 | 0.0019 | 0.42    | 0.45    | 0.13         |
|         | 38  | 0.0022 | 0.002 | 0.010 | 88.2 | 0.0057 | 0.013 | 0.014 | 0.0005 | —       | 0.78    | 0.42         |
|         | 39  | 0.0022 | 0.002 | 0.010 | 89.0 | 0.0057 | —     | —     | —      | —       | —       | 0.42         |
|         | 40  | 0.0039 | 0.003 | 0.044 | 88.6 | 0.0049 | 0.012 | 0.012 | 0.0030 | 0.46    | 0.42    | 0.33         |
|         | 41  | 0.0051 | 0.004 | 0.024 | 87.2 | 0.0056 | 0.014 | 0.015 | 0.0068 | 0.78    | 0.10    | 0.90         |

TABLE 3

|             |     | Outer Sheath (mass %) | | | Wire Components (mass %) | | | | | | | | | |
|-------------|-----|-------|-------|--------|---------|----------|-------|-----|------|-----|-------|---------|---------|----------|
|             | No. | Ti    | Al    | B      | TiO$_2$ | Total.Si | C     | Mn  | Mo   | Ni  | S.Mg  | Total.F | Total.K | Total.Na |
| Comparative | 42  | 0.012 | 0.005 | 0.0000 | 4.39    | 0.38     | 0.09  | 1.8 | 0.34 | 2.1 | 0.63  | 0.140   | 0.190   | 0.126    |
| Example     | 43  | 0.003 | 0.009 | 0.000  | 9.10    | 0.38     | 0.05  | 1.1 | 0.63 | 2.4 | 0.66  | 0.210   | 0.120   | 0.199    |
|             | 44  | 0.006 | 0.006 | 0.001  | 2.50    | 0.28     | 0.07  | 2.3 | 0.12 | 2.3 | 0.68  | 0.100   | 0.120   | 0.083    |
|             | 45  | 0.004 | 0.007 | 0.000  | 5.86    | 0.65     | 0.09  | 2.3 | 0.50 | 2.0 | 0.68  | 0.120   | 0.290   | 0.227    |
|             | 46  | 0.002 | 0.013 | 0.000  | 5.81    | 0.05     | 0.07  | 1.7 | 0.08 | 2.1 | 0.62  | 0.260   | 0.140   | 0.049    |
|             | 47  | 0.004 | 0.005 | 0.000  | 5.78    | 0.34     | 0.19  | 1.9 | 0.54 | 2.3 | 0.59  | 0.190   | 0.180   | 0.245    |
|             | 48  | 0.006 | 0.013 | 0.001  | 5.06    | 0.34     | 0.007 | 1.2 | 0.16 | 1.7 | 0.69  | 0.110   | 0.160   | 0.188    |
|             | 49  | 0.006 | 0.007 | 0.000  | 6.67    | 0.28     | 0.08  | 3.5 | 0.13 | 2.3 | 0.78  | 0.220   | 0.190   | 0.128    |
|             | 50  | 0.005 | 0.011 | 0.000  | 4.04    | 0.31     | 0.11  | 0.4 | 0.34 | 2.4 | 0.56  | 0.220   | 0.140   | 0.048    |
|             | 51  | 0.003 | 0.007 | 0.001  | 5.21    | 0.26     | 0.06  | 2.4 | 0.91 | 2.1 | 0.54  | 0.100   | 0.210   | 0.063    |
|             | 52  | 0.008 | 0.006 | 0.000  | 6.48    | 0.23     | 0.12  | 2.2 | 0.006| 2.0 | 0.56  | 0.110   | 0.240   | 0.230    |
|             | 53  | 0.004 | 0.012 | 0.000  | 6.40    | 0.31     | 0.08  | 1.8 | 0.16 | 3.2 | 0.57  | 0.180   | 0.240   | 0.204    |
|             | 54  | 0.004 | 0.007 | 0.001  | 6.22    | 0.37     | 0.07  | 1.5 | 0.52 | 0.8 | 0.61  | 0.170   | 0.170   | 0.194    |
|             | 55  | 0.003 | 0.012 | 0.000  | 4.20    | 0.25     | 0.05  | 2.4 | 0.27 | 2.0 | 1.2   | 0.290   | 0.250   | 0.193    |
|             | 56  | 0.008 | 0.009 | 0.001  | 6.54    | 0.32     | 0.09  | 2.0 | 0.55 | 1.6 | 0.01  | 0.300   | 0.230   | 0.110    |

|             |     | Wire Components (mass %) | | | | | | | | | | |
|-------------|-----|--------|-------|-------|------|--------|-------|-------|--------|---------|---------|--------------|
|             | No. | B      | S.Ti  | S.Al  | Fe   | V      | S     | P     | Nb     | ZrO$_2$ | Al$_2$O$_3$ | F(Ti, B, Al) |
| Comparative | 42  | 0.0035 | 0.010 | 0.006 | 88.2 | 0.0036 | 0.019 | 0.016 | 0.0028 | 0.75    | 0.78    | 2.46         |
| Example     | 43  | 0.0023 | 0.002 | 0.015 | 84.5 | 0.0076 | 0.010 | 0.005 | 0.0054 | 0.21    | 0.42    | 0.33         |
|             | 44  | 0.0035 | 0.005 | 0.026 | 90.5 | 0.0019 | 0.020 | 0.016 | 0.0049 | 0.58    | 0.27    | 0.05         |
|             | 45  | 0.0038 | 0.001 | 0.018 | 86.5 | 0.0061 | 0.010 | 0.006 | 0.0067 | 0.26    | 0.44    | 1.76         |
|             | 46  | 0.0028 | 0.004 | 0.010 | 88.2 | 0.0044 | 0.011 | 0.020 | 0.0009 | 0.66    | 0.20    | 0.11         |
|             | 47  | 0.0032 | 0.003 | 0.029 | 86.9 | 0.0068 | 0.019 | 0.017 | 0.0041 | 0.33    | 0.39    | 0.25         |
|             | 48  | 0.0024 | 0.003 | 0.006 | 89.6 | 0.0014 | 0.015 | 0.018 | 0.0056 | 0.20    | 0.54    | 0.32         |
|             | 49  | 0.0023 | 0.004 | 0.029 | 84.9 | 0.0040 | 0.010 | 0.013 | 0.0072 | 0.17    | 0.60    | 0.00         |
|             | 50  | 0.0037 | 0.002 | 0.020 | 90.5 | 0.0075 | 0.011 | 0.013 | 0.0070 | 0.50    | 0.37    | 1.00         |
|             | 51  | 0.0034 | 0.003 | 0.025 | 86.9 | 0.0064 | 0.014 | 0.009 | 0.0012 | 0.51    | 0.69    | 0.36         |
|             | 52  | 0.0033 | 0.003 | 0.024 | 87.0 | 0.0062 | 0.014 | 0.017 | 0.0009 | 0.48    | 0.25    | 0.34         |
|             | 53  | 0.0021 | 0.003 | 0.015 | 86.0 | 0.0058 | 0.015 | 0.008 | 0.0024 | 0.39    | 0.44    | 0.05         |
|             | 54  | 0.0040 | 0.003 | 0.017 | 88.1 | 0.0041 | 0.018 | 0.008 | 0.0078 | 0.80    | 0.44    | 0.92         |
|             | 55  | 0.0026 | 0.002 | 0.008 | 88.2 | 0.0035 | 0.009 | 0.016 | 0.0029 | 0.23    | 0.44    | 0.92         |
|             | 56  | 0.0036 | 0.006 | 0.005 | 87.0 | 0.0073 | 0.016 | 0.008 | 0.0003 | 0.59    | 0.60    | 0.02         |

TABLE 3-continued

|  |  | Outer Sheath (mass %) | | | Wire Components (mass %) | | | | | | | | |
|---|---|---|---|---|---|---|---|---|---|---|---|---|---|
|  | No. | Ti | Al | B | TiO$_2$ | Total.Si | C | Mn | Mo | Ni | S.Mg | Total.F | Total.K | Total.Na |
| Comparative | 57 | 0.006 | 0.007 | 0.000 | 6.09 | 0.37 | 0.06 | 1.5 | 0.09 | 2.1 | 0.72 | 0.600 | 0.270 | 0.131 |
| Example | 58 | 0.006 | 0.007 | 0.001 | 4.96 | 0.40 | 0.12 | 2.1 | 0.44 | 1.8 | 0.61 | 0.007 | 0.190 | 0.145 |
|  | 59 | 0.009 | 0.004 | 0.000 | 4.17 | 0.22 | 0.11 | 1.6 | 0.07 | 2.0 | 0.62 | 0.270 | 0.500 | 0.036 |
|  | 60 | 0.009 | 0.010 | 0.000 | 6.28 | 0.34 | 0.09 | 1.7 | 0.54 | 1.9 | 0.63 | 0.280 | 0.008 | 0.166 |
|  | 61 | 0.004 | 0.005 | 0.000 | 5.83 | 0.22 | 0.10 | 0.9 | 0.17 | 2.4 | 0.62 | 0.230 | 0.100 | 0.700 |
|  | 62 | 0.004 | 0.014 | 0.000 | 5.81 | 0.39 | 0.07 | 1.8 | 0.52 | 2.3 | 0.50 | 0.250 | 0.240 | 0.002 |
|  | 63 | 0.007 | 0.005 | 0.000 | 4.77 | 0.39 | 0.08 | 1.2 | 0.59 | 2.4 | 0.66 | 0.210 | 0.200 | 0.166 |
|  | 64 | 0.009 | 0.014 | 0.000 | 4.54 | 0.34 | 0.11 | 2.0 | 0.28 | 1.7 | 0.66 | 0.250 | 0.190 | 0.114 |
|  | 65 | 0.004 | 0.005 | 0.000 | 4.27 | 0.26 | 0.09 | 2.1 | 0.28 | 2.1 | 0.57 | 0.120 | 0.190 | 0.033 |
|  | 66 | 0.008 | 0.014 | 0.000 | 4.06 | 0.27 | 0.08 | 1.3 | 0.40 | 2.4 | 0.75 | 0.270 | 0.140 | 0.162 |
|  | 67 | 0.003 | 0.008 | 0.000 | 10.25 | 0.49 | 0.12 | 2.9 | 0.70 | 2.9 | 0.85 | 0.300 | 0.310 | 0.315 |
|  | 68 | 0.001 | 0.007 | 0.000 | 6.00 | 0.35 | 0.11 | 2.2 | 0.27 | 2.0 | 0.57 | 0.100 | 0.280 | 0.191 |

|  |  | Wire Components (mass %) | | | | | | | | | | |
|---|---|---|---|---|---|---|---|---|---|---|---|---|
|  | No. | B | S.Ti | S.Al | Fe | V | S | P | Nb | ZrO$_2$ | Al$_2$O$_3$ | F(Ti, B, Al) |
| Comparative | 57 | 0.0040 | 0.002 | 0.028 | 87.8 | 0.0052 | 0.014 | 0.006 | 0.0046 | 0.15 | 0.04 | 0.87 |
| Example | 58 | 0.0023 | 0.002 | 0.014 | 87.8 | 0.0006 | 0.013 | 0.008 | 0.0064 | 0.80 | 0.54 | 0.35 |
|  | 59 | 0.0022 | 0.004 | 0.023 | 89.0 | 0.0044 | 0.012 | 0.008 | 0.0016 | 0.62 | 0.77 | 0.00 |
|  | 60 | 0.0030 | 0.006 | 0.011 | 87.3 | 0.0046 | 0.015 | 0.015 | 0.0043 | 0.29 | 0.44 | 0.04 |
|  | 61 | 0.0025 | 0.002 | 0.018 | 87.7 | 0.0033 | 0.013 | 0.011 | 0.0057 | 0.71 | 0.29 | 0.36 |
|  | 62 | 0.0031 | 0.006 | 0.006 | 87.9 | 0.0016 | 0.012 | 0.014 | 0.0015 | 0.15 | 0.07 | 0.04 |
|  | 63 | 0.0060 | 0.005 | 0.029 | 88.6 | 0.0075 | 0.009 | 0.007 | 0.0053 | 0.11 | 0.57 | 0.86 |
|  | 64 | 0.0006 | 0.002 | 0.024 | 88.9 | 0.0068 | 0.013 | 0.016 | 0.0046 | 0.28 | 0.52 | 0.02 |
|  | 65 | 0.0030 | 0.011 | 0.029 | 89.2 | 0.0060 | 0.014 | 0.006 | 0.0022 | 0.35 | 0.34 | 1.10 |
|  | 66 | 0.0023 | 0.002 | 0.08 | 89.3 | 0.0026 | 0.011 | 0.019 | 0.0032 | 0.18 | 0.59 | 0.06 |
|  | 67 | 0.0025 | 0.001 | 0.018 | 78.8 | 0.0059 | 0.011 | 0.010 | 0.0064 | 0.87 | 0.88 | 0.70 |
|  | 68 | 0.0030 | 0.003 | 0.010 | 86.7 | 0.0101 | 0.016 | 0.008 | 0.0034 | 0.78 | 0.43 | 0.56 |

Next, gas arc welding was performed on the matrix shown in Table 4 below by using each of the flux-cored wires of Examples and Comparative Example. As to the matrix composition shown in Table 4, the remainder is Fe and unavoidable impurities.

TABLE 4

| Matrix | Plate Thickness (mm) | Component Composition (mass %) | | | | | | | |
|---|---|---|---|---|---|---|---|---|---|
|  |  | C | Si | Mn | P | S | Cu | Cr | Mo |
| JIS G 3128 SHY685 | 20 | 0.12 | 0.26 | 0.78 | 0.008 | <0.001 | 0.19 | 0.43 | 0.43 |

The welding conditions are as follows.
Shielding gas: 80% Ar-20% CO$_2$, 25 liters/min
Wire diameter: φ1.2
Welding position: flat
Groove shape: 20° V
Groove gap: 16 mm
Welding current: 280 A
Arc voltage: 29 V
Welding speed: 350 mm/min
Welding heat input: 1.4 kJ/mm With respect to the weld metal obtained by gas arc welding using each of the flux-cored wires of Examples and Comparative Examples, the mechanical properties, diffusible hydrogen content and high-temperature cracking resistance were evaluated by the following methods.

<Mechanical Properties>

The mechanical properties of the weld metal were evaluated by a tensile test and an impact test in conformity with "Methods for Tensile and Impact Tests of Weld Metal" specified in JIS Z 3111. As to the low-temperature toughness, the weld metal was judged as Pass when the impact value at −60° C. was 47 J or more and the impact value at −40° C. was 69 J or more. At to the 0.2% yield strength, the weld metal was judged as Pass when it was 690 MPa or more. As to the tensile strength TS, the weld metal was judged as Pass when it was from 770 to 930 MPa.

<Diffusible Hydrogen Content>

The diffusible hydrogen content of the weld metal was evaluated by the method in conformity with JIS Z 3118. The weld metal where the diffusible hydrogen content was 4 ml/100 g or less was judged as Pass.

<High-Temperature Cracking Resistance>

The evaluation was performed based on "Method for Butt-Welding Crack Test with C-Type High-Speed Jig" specified in JIS Z 3155. At this time, the welding conditions were a current of 200 A, a voltage of 20 V, and a speed of 200 mm/min. The weld metal was rated "A" when the cracking rate was 10% or less, was rated "B" when the cracking rate was more than 10% and less than 30%, and was rated "C" when the cracking rate was 30% or more, and those rated "C" were judged to be impracticable.

<Welding Usability>

The welding usability was evaluated by the compatibility between matrix and bead and the cross-sectional shape of bead by performing vertical upward fillet welding on the matrix shown in Table 3. The weld usability was rated "A" when vertical upward welding was possible and the bead surface after welding was smooth, was rated "B" when vertical upward welding was possible but significant unevenness was generated on the bead surface after welding, and was rated "C" when the slag or molten metal dropped down to make welding impossible or the bead surface took on a largely concave shape due to insufficient deposition amount.

The welding conditions are as follows.
Shielding gas: 80% Ar-20% $CO_2$, 25 liters/min
Wire diameter: ϕ1.2
Groove gap: 0 mm
Welding current: 220 A
Arc voltage: 24 V
Welding speed: 150 mm/min
Weaving width: 10 mm
Welding heat input: 2.1 kJ/mm The results are shown together in Table 5 below.

TABLE 5

|  | No. | CVN −60 (J) | CVN −40 (J) | 0.2% PS | TS (MPa) | [H]d (ml/100 g) | Workability (VUF) | High-Temperature Cracking (BEND) |
|---|---|---|---|---|---|---|---|---|
| Example | 1 | 83 | 94 | 739 | 808 | 2.8 | A | A |
|  | 2 | 47 | 70 | 733 | 815 | 2.2 | A | A |
|  | 3 | 67 | 90 | 731 | 822 | 3.4 | B | A |
|  | 4 | 89 | 89 | 741 | 929 | 2.4 | A | A |
|  | 5 | 47 | 71 | 752 | 869 | 2.3 | B | A |
|  | 6 | 47 | 69 | 763 | 907 | 1.8 | A | A |
|  | 7 | 80 | 93 | 696 | 860 | 1.6 | A | A |
|  | 8 | 82 | 94 | 787 | 926 | 2.8 | A | A |
|  | 9 | 47 | 71 | 730 | 828 | 3.8 | A | A |
|  | 10 | 82 | 104 | 757 | 927 | 3.8 | A | A |
|  | 11 | 63 | 104 | 693 | 771 | 1.9 | A | A |
|  | 12 | 73 | 98 | 716 | 796 | 2.4 | A | B |
|  | 13 | 49 | 69 | 725 | 850 | 1.8 | A | A |
|  | 14 | 81 | 101 | 734 | 854 | 3.8 | A | A |
|  | 15 | 47 | 70 | 753 | 801 | 3.8 | A | A |
|  | 16 | 63 | 96 | 714 | 871 | 4.0 | A | A |
|  | 17 | 76 | 101 | 762 | 868 | 4.0 | A | A |
|  | 18 | 83 | 101 | 744 | 833 | 3.8 | A | A |
|  | 19 | 82 | 101 | 709 | 861 | 3.0 | A-B | A |
|  | 20 | 75 | 92 | 714 | 852 | 3.9 | A | A |
|  | 21 | 54 | 99 | 724 | 872 | 2.6 | A-B | A |
|  | 22 | 76 | 94 | 726 | 839 | 3.7 | A | B |
|  | 23 | 49 | 70 | 706 | 833 | 2.9 | A | A |
|  | 24 | 52 | 70 | 715 | 828 | 3.0 | A | A |
|  | 25 | 47 | 69 | 763 | 825 | 2.5 | A | A |
|  | 26 | 49 | 71 | 815 | 927 | 2.4 | B | B |
|  | 27 | 47 | 70 | 738 | 802 | 3.4 | A | A |
|  | 28 | 62 | 90 | 753 | 816 | 2.6 | A | B |
|  | 29 | 77 | 98 | 719 | 865 | 3.2 | A-B | A |
|  | 30 | 64 | 99 | 708 | 809 | 3.8 | A | B |
|  | 31 | 57 | 70 | 728 | 807 | 2.3 | A | A |
|  | 32 | 73 | 104 | 758 | 799 | 2.4 | A-B | A |
|  | 33 | 59 | 102 | 741 | 807 | 3.3 | A-B | A |
|  | 34 | 65 | 92 | 717 | 846 | 2.6 | A-B | A |
|  | 35 | 76 | 96 | 714 | 864 | 2.0 | A-B | A |
|  | 36 | 47 | 70 | 715 | 870 | 2.8 | A | A |
|  | 37 | 78 | 99 | 720 | 866 | 3.3 | A-B | A |
|  | 38 | 59 | 102 | 742 | 806 | 3.3 | A-B | A |
|  | 39 | 60 | 101 | 730 | 802 | 3.1 | B | A |
|  | 40 | 48 | 71 | 734 | 829 | 3.1 | A | A |
|  | 41 | 55 | 90 | 724 | 845 | 2.9 | A | B |
| Comparative Example | 42 | 34 | 56 | 727 | 836 | 2.4 | A | A |
|  | 43 | 33 | 33 | 720 | 877 | 2.8 | A | A |
|  | 44 | 74 | 100 | 714 | 844 | 3.8 | C | A |
|  | 45 | 72 | 102 | 826 | 935 | 3.4 | A | A |
|  | 46 | 41 | 50 | 711 | 811 | 3.6 | C | A |
|  | 47 | 15 | 64 | 896 | 991 | 1.9 | A | A |
|  | 48 | 74 | 101 | 674 | 815 | 3.8 | A | A |
|  | 49 | 88 | 97 | 803 | 991 | 3.0 | A | A |
|  | 50 | 37 | 36 | 750 | 807 | 2.2 | A | A |
|  | 51 | 58 | 98 | 877 | 935 | 2.7 | A | A |
|  | 52 | 62 | 102 | 679 | 665 | 3.5 | A | A |
|  | 53 | 79 | 98 | 737 | 853 | 3.1 | A | C |
|  | 54 | 42 | 39 | 722 | 838 | 3.1 | A | A |
|  | 55 | 75 | 97 | 801 | 936 | 2.0 | A | A |
|  | 56 | 42 | 39 | 722 | 810 | 2.2 | A | A |
|  | 57 | 53 | 98 | 710 | 805 | 5.3 | A | A |
|  | 58 | 76 | 92 | 731 | 817 | 4.5 | A | A |
|  | 59 | 80 | 101 | 728 | 815 | 7.5 | A | A |
|  | 60 | 68 | 97 | 741 | 861 | 3.9 | C | A |

TABLE 5-continued

| No. | CVN −60 (J) | CVN −40 (J) | 0.2% PS | TS (MPa) | [H]d (ml/100 g) | Workability (VUF) | High-Temperature Cracking (BEND) |
|---|---|---|---|---|---|---|---|
| 61 | 90 | 90 | 722 | 875 | 7.3 | A | A |
| 62 | 54 | 93 | 763 | 840 | 3.4 | C | A |
| 63 | 61 | 101 | 726 | 855 | 2.1 | A | C |
| 64 | 27 | 21 | 759 | 817 | 3.4 | A | A |
| 65 | 37 | 64 | 707 | 802 | 2.7 | A | A |
| 66 | 40 | 50 | 762 | 824 | 1.7 | A | A |
| 67 | 42 | 68 | 756 | 837 | 3.2 | C | A |
| 68 | 34 | 26 | 718 | 861 | 2.6 | A | A |

As seen from Table 5, in the flux-cored wire No. 42 of Comparative Example where the Ti content in the outer sheath exceeded the range of the present invention, the low-temperature toughness was poor. In the flux-cored wire No. 43 of Comparative Example where the TiO$_2$ content exceeded the range of the present invention, the low-temperature toughness of the weld metal was poor. In the flux-cored wire No. 44 of Comparative Example where the TiO$_2$ content was less than the range of the present invention, dropping of molten metal was generated, and the welding usability was deteriorated. In the flux-cored wire No. 45 of Comparative Example where the total content of Si exceeded the range of the present invention, the strength of the weld metal was excessive. In the flux-cored wire No. 46 of Comparative Example where the total content of Si was less than the range of the present invention, the compatibility of bead was deteriorated, and the low-temperature toughness was poor.

In the flux-cored wire No. 47 of Comparative Example where the C content exceeded the range of the present invention, the low-temperature toughness and strength of the weld metal were poor. In the flux-cored wire No. 48 of Comparative Example where the C content was less than the range of the present invention, the 0.2% yield strength of the weld metal was poor. In the flux-cored wire No. 49 of Comparative Example where the Mn content exceeded the range of the present invention, the strength of the weld metal was excessive, and the 0.2% yield strength was poor. In the flux-cored wire No. 50 of Comparative Example where the Mn content was less than the range of the present invention, the strength of the weld metal was insufficient.

In the flux-cored wire No. 51 of Comparative Example where the Mo content exceeded the range of the present invention, the strength of the weld metal was excessive. In the flux-cored wire No. 52 of Comparative Example where the Mo content was less than the range of the present invention, the low-temperature toughness of the weld metal was deteriorated. In the flux-cored wire No. 53 of Comparative Example where the Ni content exceeded the range of the present invention, the high-temperature cracking resistance of the weld metal was poor. In the flux-cored wire No. 54 of Comparative Example where the Ni content was less than the range of the present invention, the low-temperature toughness of the weld metal was poor.

In the flux-cored wire No. 55 of Comparative Example where the total content of Mg exceeded the range of the present invention, the strength of the weld metal was excessive. In the flux-cored wire No. 56 of Comparative Example where the total content of Mg was less than the range of the present invention, the low-temperature toughness of the weld metal was poor. In all of the flux-cored wire No. 57 of Comparative Example where the total content of F exceeded the range of the present invention, the flux-cored wire No. 58 of Comparative Example where the total content of F was less than the range of the present invention, and the flux-cored wire No. 59 of Comparative Example where the total content of K exceeded the range of the present invention, the diffusible hydrogen content of the weld metal was large.

In the flux-cored wire No. 60 of Comparative Example where the total content of K was less than the range of the present invention, the arc was unstable. In the flux-cored wire No. 61 of Comparative Example where the total content of Na exceeded the range of the present invention, the diffusible hydrogen content of the weld metal was large. In the flux-cored wire No. 62 of Comparative Example where the total content of Na was less than the range of the present invention, the arc was unstable.

In the flux-cored wire No. 63 of Comparative Example where the B content exceeded the range of the present invention, the high-temperature cracking resistance of the weld metal was poor. In all of the flux-cored wire No. 64 of Comparative Example where the B content was less than the range of the present invention, the flux-cored wire No. 65 of Comparative Example where the content of the metal Ti exceeded the range of the present invention, and the flux-cored wire No. 66 of Comparative Example where the content of the metal Al exceeded the range of the present invention, the low-temperature toughness of the weld metal was poor.

In the flux-cored wire No. 67 of Comparative Example where the Fe content was less than the range of the present invention, the low-temperature toughness of the weld metal was poor and furthermore, the deposition amount was insufficient, causing the bead to take on a largely concave shape. In the flux-cored wire No. 68 of Comparative Example where the V content exceeded the range of the present invention, the low-temperature toughness of the weld metal was poor.

The flux-cored wire Nos. 1 to 41 of Examples of the present invention were excellent in all evaluations.

In the embodiment according to the present invention, the following configurations may be taken.

[1] A flux-cored wire for gas-shielded arc welding which has a steel outer sheath filled with a flux, comprising, relative to a total mass of the wire:

TiO$_2$: from 3 to 8 mass %;
at least one of Si, an Si oxide and an Si compound: from 0.1 to 0.5 mass % in total in terms of Si;
C: from 0.01 to 0.15 mass %;
Mn: from 0.5 to 3.0 mass %;
Mo: from 0.01 to 0.80 mass %;
Ni: from 1 to 3 mass %;
at least one of metal Mg and an Mg alloy: from 0.2 to 1.0 mass % in total in terms of Mg;

an F compound: from 0.010 to 0.400 mass % in total in terms of F;

a K compound: from 0.010 to 0.400 mass % in total in terms of K;

an Na compound: from 0.005 to 0.400 mass % in total in terms of Na;

B and a B compound: from 0.001 to 0.005 mass % in total in terms of B; and

Fe: 80 mass % or more, wherein a total content of metal Ti and a Ti alloy is restricted to 0.01 mass % or less in terms of Ti, a total content of metal Al and an Al alloy is restricted to 0.05 mass % or less in terms of Al, a content of V is restricted to less than 0.010 mass %, and a content of Ti is restricted to 0.011 mass % or less relative to the total mass of the steel outer sheath.

[2] The flux-cored wire for gas-shielded arc welding according to claim [1], wherein a content of Al is restricted to 0.05 mass % or less relative to the total mass of the steel outer sheath

[3] The flux-cored wire for gas-shielded arc welding according to claim [1] or [2], wherein a content of B is restricted to 0.005 mass % or less relative to the total mass of the steel outer sheath.

[4] The flux-cored wire for gas-shielded arc welding according to any one of [1] to [3], wherein when, relative to the total mass of the wire, the total content of the metal Ti and Ti alloy in terms of Ti is [Ti], the total content of the B and B compound in terms of B is [B], and the total content of the metal Al and Al alloy in terms of Al is [Al], the relationship thereof satisfies the following mathematical expression:

$$1000 \times \{[Ti]-([B])^{0.9}\}^2/[Al] \leq 2.00.$$

[5] The flux-cored wire for gas-shielded arc welding according to any one of [1] to [4], further comprising at least one of: S: from 0.005 to 0.030 mass %; $ZrO_2$: from 0.05 to 1.00 mass %; and $Al_2O_3$: from 0.01 to 1.00 mass %.

[6] The flux-cored wire for gas-shielded arc welding according to any one of [1] to [5], wherein a content of P is restricted to 0.030 mass % or less per the total amount of the wire.

[7] The flux-cored wire for gas-shielded arc welding according to any one of [1] to [6], wherein a content of Nb is restricted to less than 0.010 mass % per the total amount of the wire.

While the present invention has been described in detail and with reference to specific embodiments thereof, it will be apparent to one skilled in the art that various changes and modifications can be made therein without departing from the spirit and scope of the present invention.

This application is based on Japanese Patent Application No. 2014-211255 filed on Oct. 15, 2014, the contents of which are incorporated herein by way of reference.

INDUSTRIAL APPLICABILITY

The flux-cored wire for gas-shielded arc welding in the present invention enables all-position welding and is useful for welding in a large structure such as offshore structure.

The invention claimed is:

1. A flux-cored wire comprising: relative to a total mass of the wire:

TiO2: from 3 to 8 mass %;

at least one of Si, an Si oxide and an Si compound: from 0.1 to 0.5 mass % in total in terms of Si;

C: from 0.01 to 0.15 mass %;

Mn: from 2.3 to 3.0 mass %;

Mo: from 0.01 to 0.80 mass %;

Ni: from 1 to 3 mass %;

at least one of metal Mg and an Mg alloy: from 0.2 to 1.0 mass % in total in terms of Mg;

an F compound: from 0.010 to 0.400 mass % in total in terms of F;

a K compound: from 0.010 to 0.400 mass % in total in terms of K;

an Na compound: from 0.005 to 0.400 mass % in total in terms of Na;

B and a B compound: from 0.001 to 0.005 mass % in total in terms of B; and

Fe: 80 mass % or more, metal Ti and a Ti alloy: 0.01 mass % or less in total in terms of Ti, metal Al and an Al alloy: 0.05 mass % or less in total in terms of Al, and V: less than 0.010 mass %, wherein the flux-cored wire is for gas-shielded arc welding which has a steel outer sheath filled with a flux, and the steel outer sheath comprises Ti: 0.011 mass % or less relative to a total mass of the steel outer sheath.

2. The flux-cored according to claim 1, wherein the steel outer sheath further comprises: at least one selected from the group consisting of Al: 0.05 mass % or less relative to the total mass of the steel outer sheath; and B: 0.005 mass % or less relative to the total mass of the steel outer sheath.

3. The flux-cored according to claim 1, satisfying:

$$1000 \times \{[Ti]-([B])^{o.9}\}^2/[Al] < 2.00,$$

where [Ti] is the total content of the metal Ti and Ti alloy in terms of Ti in the wire relative to the total mass of the wire; [B] is the total content of the B and B compound in terms of B in the wire relative to the total mass of the wire; and [Al] is the total content of the metal Al and Al alloy in terms of Al in the wire relative to the total mass of the wire.

4. The flux-cored according to claim 1, wherein the wire further comprises: at least one selected from the group consisting of:

S: from 0.005 to 0.030 mass % per the total amount of the wire;

$ZrO_2$: from 0.05 to 1.00 mass % per the total amount of the wire; and $Al_2O_3$: from 0.01 to 1.00 mass % per the total amount of the wire.

5. The flux-cored according to claim 1, wherein the wire further comprises: at least one selected from the group consisting of:

P: 0.030 mass % or less per the total amount of the wire; and

Nb: less than 0.010 mass % per the total amount of the wire.

6. The flux-cored according to claim 1, wherein the wire comprises Mo in a content of from 0.01 to 0.29 mass % relative to the total mass of the wire.

7. The flux-cored according to claim 1, wherein the total content of metal Ti and a Ti alloy in terms of Ti, relative to the total mass of the wire, is 0.004 mass % or less.

8. The flux-cored according to claim 2, satisfying:

$$1000 \times \{[Ti]-([B])^{o.9}\}^2/[Al] < 2.00,$$

where [Ti] is the total content of the metal Ti and Ti alloy in terms of Ti in the wire relative to the total mass of the wire; [B] is the total content of the B and B compound in terms of B in the wire relative to the total mass of the wire; and [Al] is the total content of the metal Al and Al alloy in terms of Al in the wire relative to the total mass of the wire.

9. The flux-cored according to claim 2, wherein the wire further comprises: at least one selected from the group consisting of:
   S: from 0.005 to 0.030 mass % per the total amount of the wire;
   $ZrO_2$: from 0.05 to 1.00 mass % per the total amount of the wire; and
   $Al_2O_3$: from 0.01 to 1.00 mass % per the total amount of the wire.

10. The flux-cored according to claim 2, wherein the wire further comprises: at least one selected from the group consisting of:
    P: 0.030 mass % or less per the total amount of the wire; and
    Nb: less than 0.010 mass % per the total amount of the wire.

11. The flux-cored according to claim 3, wherein the wire further comprises: at least one selected from the group consisting of:
    P: 0.030 mass % or less per the total amount of the wire; and
    Nb: less than 0.010 mass % per the total amount of the wire.

12. The flux-cored according to claim 4, wherein the wire further comprises: at least one selected from the group consisting of:
    P: 0.030 mass % or less per the total amount of the wire; and
    Nb: less than 0.010 mass % per the total amount of the wire.

13. The flux-cored according to claim 3, wherein the wire further comprises: at least one selected from the group consisting of:
    S: from 0.005 to 0.030 mass % per the total amount of the wire;
    $ZrO_2$: from 0.05 to 1.00 mass % per the total amount of the wire; and
    $Al_2O_3$: from 0.01 to 1.00 mass % per the total amount of the wire.

14. The flux-cored according to claim 8, wherein the wire further comprises: at least one selected from the group consisting of:
    S: from 0.005 to 0.030 mass % per the total amount of the wire;
    $ZrO_2$: from 0.05 to 1.00 mass % per the total amount of the wire; and
    $Al_2O_3$: from 0.01 to 1.00 mass % per the total amount of the wire.

15. The flux-cored according to claim 8, wherein the wire further comprises: at least one selected from the group consisting of:
    P: 0.030 mass % or less per the total amount of the wire; and
    Nb: less than 0.010 mass % per the total amount of the wire.

16. The flux-cored according to claim 9, wherein the wire further comprises: at least one selected from the group consisting of:
    P: 0.030 mass % or less per the total amount of the wire; and
    Nb: less than 0.010 mass % per the total amount of the wire.

17. The flux-cored according to claim 13, wherein the wire further comprises: at least one selected from the group consisting of:
    P: 0.030 mass % or less per the total amount of the wire; and
    Nb: less than 0.010 mass % per the total amount of the wire.

18. The flux-cored according to claim 14, wherein the wire further comprises: at least one selected from the group consisting of:
    P: 0.030 mass % or less per the total amount of the wire; and
    Nb: less than 0.010 mass % per the total amount of the wire.

* * * * *